(12) United States Patent
Emanuel et al.

(10) Patent No.: US 9,710,450 B2
(45) Date of Patent: Jul. 18, 2017

(54) RECOMBINING INCORRECTLY SEPARATED TOKENS IN NATURAL LANGUAGE PROCESSING

(71) Applicant: International Business Machines Corporation, Armonk, NY (US)

(72) Inventors: Barton W. Emanuel, Manassas, VA (US); Ahmed M. A. Nassar, Katy, TX (US); Sarbajit K. Rakshit, Kolkata (IN); Craig M. Trim, Sylmar, CA (US); Albert T. Wong, Hacienda Heights, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/683,504

(22) Filed: Apr. 10, 2015

(65) Prior Publication Data
US 2016/0299885 A1 Oct. 13, 2016

(51) Int. Cl.
*G06F 17/20* (2006.01)
*G06F 17/28* (2006.01)
*G06F 17/27* (2006.01)

(52) U.S. Cl.
CPC ...... *G06F 17/2705* (2013.01); *G06F 17/2735* (2013.01)

(58) Field of Classification Search
CPC .. G06F 17/2785; G06F 17/28; G06F 17/2705; G06F 17/30684; G06F 17/243;
(Continued)

(56) References Cited

U.S. PATENT DOCUMENTS

| 5,721,938 A | 2/1998 | Stuckey |
| 8,442,940 B1 * | 5/2013 | Faletti ................. G06F 17/2785 704/9 |

(Continued)

OTHER PUBLICATIONS

Srithirath, A. et al.; A Hybrid Approach to Lao Word Segmentation using Longest Syllable Level Matching with Named Entities Recognition, 2013.

(Continued)

*Primary Examiner* — Marivelisse Santiago Cordero
*Assistant Examiner* — Stephen Brinich
(74) *Attorney, Agent, or Firm* — Garg Law Firm, PLLC; Rakesh Garg; Christopher K. McLan

(57) ABSTRACT

To recombine incorrectly separated tokens in NLP, a determination is made whether a token from an ordered set of tokens is present in a dictionary related to a corpus from which the ordered set is extracted. When the token is not present in the dictionary, and when a compounding threshold has not been reached, the token is agglutinated with a next adjacent token in the ordered set to form the compound token. The compounding threshold limits a number of tokens that can be agglutinated to form a compound token. A determination is made whether the compound token is present in the dictionary. A weight is assigned to the compound token when the compound token is present in the dictionary and a confidence rating of the compound token is computed as a function of the weight. The compound token and the confidence rating are used in NLP of the corpus.

20 Claims, 7 Drawing Sheets

(58) Field of Classification Search
CPC .............. G06F 17/277; G06F 17/30401; G06F 17/3043; G06F 17/27; G06F 17/271; G06F 17/30528; G06F 17/30598
USPC ................................................ 704/1–10, 231
See application file for complete search history.

(56) References Cited

U.S. PATENT DOCUMENTS

| | | |
|---|---|---|
| 8,781,810 B2 | 7/2014 | Cancedda et al. |
| 2013/0332822 A1* | 12/2013 | Willmore .............. G06F 17/273 715/257 |

OTHER PUBLICATIONS

Gralinski, F.; Mining the Web for Idiomatic Expressions Using Meta-linguistic Markers, 2013.
IBM, Method for presenting complex expressions including elements written with bidirectional scripts, Apr. 7, 2009.
Software Patent Institute et al.; Linguistic Analysis of Natural Language Communications with Computers, Sep. 14, 2005.
A Collection of Word Oddities and Trivia, p. 13, http://jeff560.tripod.com/words13.html, Jun. 17, 2014.
Tufis et al.; Lexical token alignment: experiments, results and applications.
Wikipedia; Agglutinative language, Feb. 3, 2015.

* cited by examiner

US 9,710,450 B2

RECOMBINING INCORRECTLY SEPARATED TOKENS IN NATURAL LANGUAGE PROCESSING

TECHNICAL FIELD

The present invention relates generally to a method, system, and computer program product for machine understanding of textual data. More particularly, the present invention relates to a method, system, and computer program product for recombining incorrectly separated tokens in Natural Language Processing.

BACKGROUND

Natural language processing (NLP) is a technique that facilitates exchange of information between humans and data processing systems. For example, one branch of NLP pertains to transforming human readable content, such as unstructured data, into machine usable data. For example, NLP engines are presently usable to accept input content such as a newspaper article or a whitepaper, and produce structured data, such as an outline of the input content, most significant and least significant parts, a subject, a reference, dependencies within the content, and the like, from the given content.

Another branch of NLP pertains to answering questions about a subject matter based on information available about the subject matter domain. Information about a domain can take many forms, including but not limited to knowledge repositories and ontologies created from machine usable data created from unstructured data in the first branch of NLP.

A corpus (plural: corpora) is data, or a collection of data, used in linguistics and language processing. A corpus generally comprises large volume of data, usually text, stored electronically. The corpus comprises unstructured data. Unstructured data is data that does not conform to any particular organization, and position or form of the content in a data fragment of unstructured data generally does not contribute to the meaning or significance of the content. A newspaper article, a whitepaper document, notes taken by a researcher, or generally human readable textual data in a variety of forms are some examples of unstructured data.

Presently, systems and methods are available to parse unstructured data. The parsing recognizes the words present in the unstructured data of a given corpus and extracts those words as tokens for use in the NLP of the corpus.

SUMMARY

The illustrative embodiments provide a method, system, and computer program product for recombining incorrectly separated tokens in Natural Language Processing. An embodiment includes a method for recombining incorrectly separated tokens in Natural Language Processing (NLP). The embodiment determines whether a token from an ordered set of tokens is present in a dictionary, the dictionary being related to a corpus from which the ordered set of tokens is extracted. The embodiment determines whether a compounding threshold has been reached, wherein the compounding threshold limits a number of tokens that can be agglutinated to form a compound token. The embodiment agglutinates, using a processor and a memory, responsive to the token not being present in the dictionary, and responsive to the compounding threshold not having been reached, the token with a next adjacent token in the ordered set of tokens to form the compound token. The embodiment determines whether the compound token is present in the dictionary. The embodiment assigns a weight to the compound token responsive to the compound token being present in the dictionary. The embodiment computes a confidence rating of the compound token, the confidence rating being a function of the weight. The embodiment uses the compound token and the confidence rating in performing an NLP operation on the corpus.

Another embodiment includes a computer program product for recombining incorrectly separated tokens in Natural Language Processing (NLP), the computer program product comprising one or more computer-readable storage media, and program instructions stored on at least one of the one or more storage media.

Another embodiment includes a computer system for recombining incorrectly separated tokens in Natural Language Processing (NLP), the computer system comprising one or more processors, one or more computer-readable memories, and one or more computer-readable storage media, and program instructions stored on at least one of the one or more storage media for execution by at least one of the one or more processors via at least one of the one or more memories.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
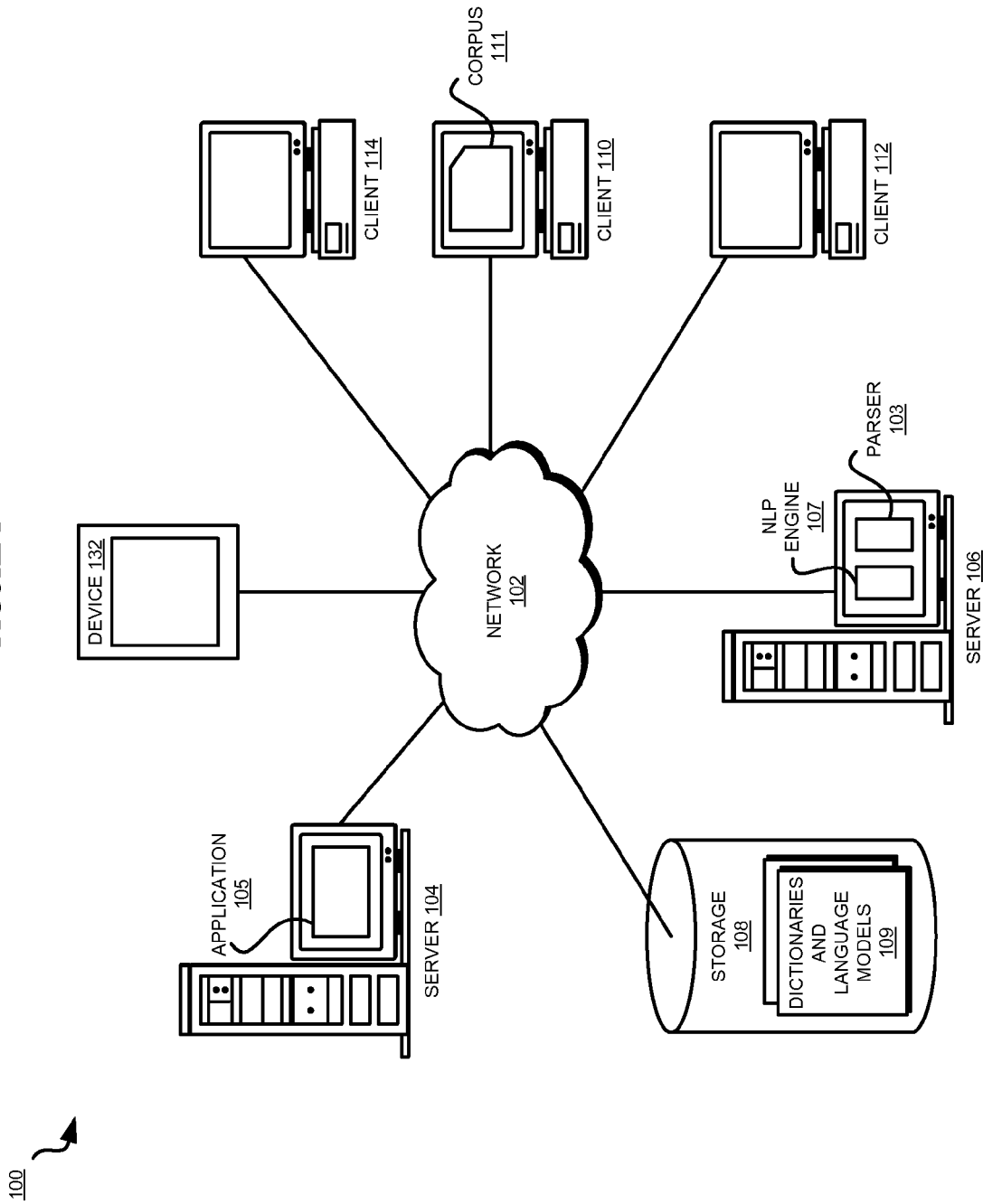
FIG. 1 depicts a block diagram of a network of data processing systems in which illustrative embodiments may be implemented.

Only as an example, and without implying any limitation thereto, the illustrative embodiments are described using English text as example unstructured data in an example corpus. Those of ordinary skill in the art will be able to adapt an embodiment to operate on other types of unstructured data, including but not limited to textual content in other languages.

Some text, which serves as the input corpus for NLP, can include split words. A common example of word splitting is hyphenation due to line wrap in the layout of the text. Split words can also occur in the corpus due to incorrect usage by an author, errors in translation or transcription, an optical character recognition (OCR) or intelligent character recognition (ICR) process for recognizing text, formatting for printing or display, storage in a repository of size limited records, or assembly of text from size restricted portions. In some cases, such as in translated texts, words can be separated or split not just by a blank space of a hyphen but also by one or more other intervening words.

The illustrative embodiments recognize that regardless of how or why separated, some words that are separated from one another in the corpus really should be concatenated or agglutinated. Agglutination is a process of joining two words together, as in string concatenation, without modifying either word. Presently, a parsing process during the NLP recognizes individual words as tokens. As a result, separated words that should be agglutinated are presently recognized as separate tokens.

In a simplified example, consider that the text of the corpus is intended to communicate the word "castaway"—a noun—but includes the words "cast" "away" separated by a blank space, a hyphen, or an intervening word. A present NLP parsing process recognizes the words "cast"—a verb, and "away"—an adverb, as tokens in the text. As a result, a downstream NLP operation uses the verb and adverb tokens "cast" and "away" to arrive at an incorrect conclusion or answer based on the corpus.

Thus, the illustrative embodiments recognize that recognizing separated words as separate tokens causes errors during NLP. A method or process to recognize such incorrectly separated tokens and to agglutinate them correctly is needed to improve the accuracy of NLP operations.

The illustrative embodiments used to describe the invention generally address and solve the above-described problems and other problems related to token extraction from unstructured data. The illustrative embodiments provide a method, system, and computer program product for recombining incorrectly separated tokens in Natural Language Processing.

An embodiment uses an existing parser, such as a parser of a presently available NLP engine, to parse given unstructured data. By performing a word-by-word parse operation according to a language model, the parser produces a set of tokens, which are used by an application implementing an embodiment to produce compound token. A compound token comprises a plurality of tokens from the set of tokens produced by a parser.

Particularly, an embodiment forms a compound token by agglutinating two or more tokens from the set of tokens. Generally, any number of tokens can be agglutinated to form a compound token. In some cases, agglutinating more than a certain number of tokens becomes counterproductive in NLP, and a compounding threshold may be set to agglutinate up to the compounding threshold number of tokens in forming a compound token. For example, observations while parsing some example English language corpora have shown that agglutinating more than four tokens more often results in incorrect compound tokens than correct ones.

The compounding threshold may be set by considering the language of the corpus, the subject matter domain of the corpus, or both. For example, the dictionaries of some languages is well populated with compound words that are significantly longer than four agglutinated words, and therefore a compounding threshold for such language may be higher than for another language, e.g., for the English language. Similarly, the dictionaries of some languages is very sparsely populated with compound words that are longer than two or three agglutinated words, and therefore a compounding threshold for such language may be lower than for another language, e.g., for the English language.

Furthermore, some subject matter domains use compound words that are formed by agglutinating as little as two words and as many as fifteen or more words, and other combinations in between. Organic chemistry and biochemistry are good example subject matter domains where such compound words can be found. For example, Acetylseryltyrosylserylisoleucylthreonylserylprolylserylglu taminylphenylalanylvalylphenylalanylleucylserylserylvalyltr yptophylalanylaspartylprolylisoleucylglutamylleucylleucylas paraginylvalylcysteinylthreonylserylseryllleucylglycylaspara ginylglutaminylphenylalanylglutaminylthreonylglutaminylglut aminylalanylarginylthreonylthreonylglutaminylvalylglutaminy lglutaminylphenylalanylserylglutaminylvalyltryptophyllysylp rolylphenylalanylprolylglutaminylserylthreonylvalylarginylp henylalanylprolylglycylaspartylvalyltyrosyllysylvalyltyrosy larginyltyrosylasparaginylalanylvalylleucylaspartylprolylle ucylisoleucylthreonylalanylleucylleucylglycylthreonylphenyl alanylaspartylthreonylarginylasparaginylarginylisoleucyliso leucylglutamylvalylglutamylasparaginylglutaminylglutaminyls erylprolylthreonylthreonylalanylglutamylthreonylleucylaspar tylalanylthreonylarginylarginylvalylaspartylaspartylalanylt hreonylvalylalanylisoleucylarginylserylalanylasparaginyliso leucylasparaginylleucylvalylasparaginylglutamylleucylvalyla rginylglycylthreonylglycylleucyltyrosylasparaginylglutaminy lasparaginylthreonylphenylalanylglutamylserylmethionylseryl glycylleucylvalyltryptophylthreonylserylalanylprolylalanyls erine is a 1,185-letter chemical term for "Tobacco Mosaic Virus, Dahlemense Stain." Therefore, a compounding threshold can be set depending upon the size of compound words or compound tokens that can be expected in a given corpus in a given subject matter domain, in a given language, or some combination thereof.

A parser provides an ordered set of tokens from a parsing. The ordered set arranges the tokens in an order in which they appear in the parsed corpus, such that a first word corresponding to a first token precedes a second word in the corpus corresponding to a second token when the first token precedes the second token in the ordered set. Similarly, a third word in the corpus corresponding to a third token follows the second word corresponding to the second token when the third token follows the second token in the ordered set. A word in the corpus may be separated from a preceding word or a following word in any of the manners described herein.

To form a compound token, the embodiment determines whether a token extracted by the parser exists in a dictionary. The dictionary may be language-specific, subject-matter-specific, or both. For example, recall the example of "cast" "away" as separate tokens. The tokens "cast" and "away" each appears in an English language dictionary as valid words, but may not appear in a dictionary constructed for or from the corpus being parsed. Consider another example, where the compound word "antidisestablishmentarianism"

is separated, for some reason, into tokens "anti" "dis" "establishment" "arian" "ism". As an example, the token "dis" may not appear in one English dictionary but may appear in a dictionary of English urban slangs. The embodiment uses a selection of dictionaries to evaluate the validity of a token obtained from a parser.

Using one or more selected dictionaries, the embodiment determines that the token does not exist in the selected dictionaries. The embodiment determines that the token should be agglutinated with a preceding token or a following token from the ordered set of tokens. The direction of agglutination—preceding or following—may be arbitrary in some cases and deliberately selected in other cases. For example, depending on the selected token, a grammatical significance of the selected token, a right-to-left or left-to-right or top-to-bottom direction of the text of the language of the corpus, or some combination of these and other factors, the embodiment can be tuned to agglutinate the selected token in a certain direction. For example, the embodiment can be configured to have directional preferences. According to one example directional preference, when a selected token satisfies a first condition, the embodiment agglutinates the selected token with the preceding token. When a selected token satisfies a second condition, the embodiment agglutinates the selected token with the following token.

The embodiment determines whether the compound token resulting from the agglutination occurs in the corpus. If the resulting compound token occurs in the corpus, the embodiment retains the compound token in a set of compound tokens. The embodiment agglutinates preceding and/or following tokens with the selected token up to a compounding threshold number of tokens have been agglutinated. The embodiment evaluates each resulting compound token in this manner. If no compound token resulting from a selected token occurs in the corpus, the embodiment adds the selected token to a dictionary or set of unknown or unrecognized tokens.

To each compound token in the set of compound tokens, the embodiment assigns a weight according to one or more of the following methods—a first method assigns a weight proportional to the length of the compound token. The longer the compound token, the higher the weight assigned to the compound token, and vice-versa. A second method assigns a weight proportional to a number of occurrences of the compound token in the corpus. The higher the number of occurrences of the compound token, the higher the weight assigned to the compound token, and vice-versa.

A third method assigns a weight depending upon the surrounding context of the compound token in the corpus. If, for example, a compound token is grammatically correct in the place where it occurs in the corpus, it receives a weight that is higher than the weight assigned to another compound token that is not grammatically accurate where it occurs in the corpus.

Of course, relevance of a compound token to a context in the corpus can be established in many ways and using a variety of logic depending upon the type of relevance sought. The example of grammatical relevance is not intended to be limiting. From this disclosure, those of ordinary skill in the art will be able to conceive many other ways of establishing contextual relevance of a compound token in a corpus and the same are contemplated within the scope of the illustrative embodiments.

An embodiment can be configured to use one of these methods, e.g., the context method, to remove certain compound tokens from the set, such as to reduce the set of compound tokens to only those tokens that at least meet a threshold context requirement of an implementation. Another method or methods can then be applied to the remaining compound tokens.

An embodiment further computes a confidence rating or score for the weighted compound tokens. Any suitable function of the one or more weights associated with a compound token can be used to compute the confidence rating of a compound token. For example, the function may take the form of $fn(w1, w2, w3)=c$, where $w1$, $w2$, and $w3$ are the weights from the three example methods described above, and $c$ is the confidence rating resulting from the function $fn$.

An embodiment further selects from confidence rated compound tokens only those tokens whose confidence rating at least meets a confidence threshold. The confidence threshold can be set in any suitable implementation-specific manner. A compound token whose confidence rating is below the confidence threshold is removed from the set of the compound tokens.

A method of an embodiment described herein, when implemented to execute on a device or data processing system, comprises substantial advancement of the functionality of that device or data processing system in token extraction from unstructured data. For example, where prior-art is limited to extracting tokens based on recognizing separate words in a corpus, an embodiment provides an extraction process to combine some such tokens into compound tokens. Operating in a manner described herein, an embodiment significantly improves the quality of machine usable information that can be extracted from unstructured data. Such manner of extracting or constructing compound tokens is unavailable in presently available devices or data processing systems. Thus, a substantial advancement of such devices or data processing systems by executing a method of an embodiment improves machine understanding of unstructured data.

The illustrative embodiments are described with respect to certain methods or techniques, domains, unstructured data, languages, grammars, parsing, tokens, conditions, weights, contexts, confidence ratings, functions, thresholds, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
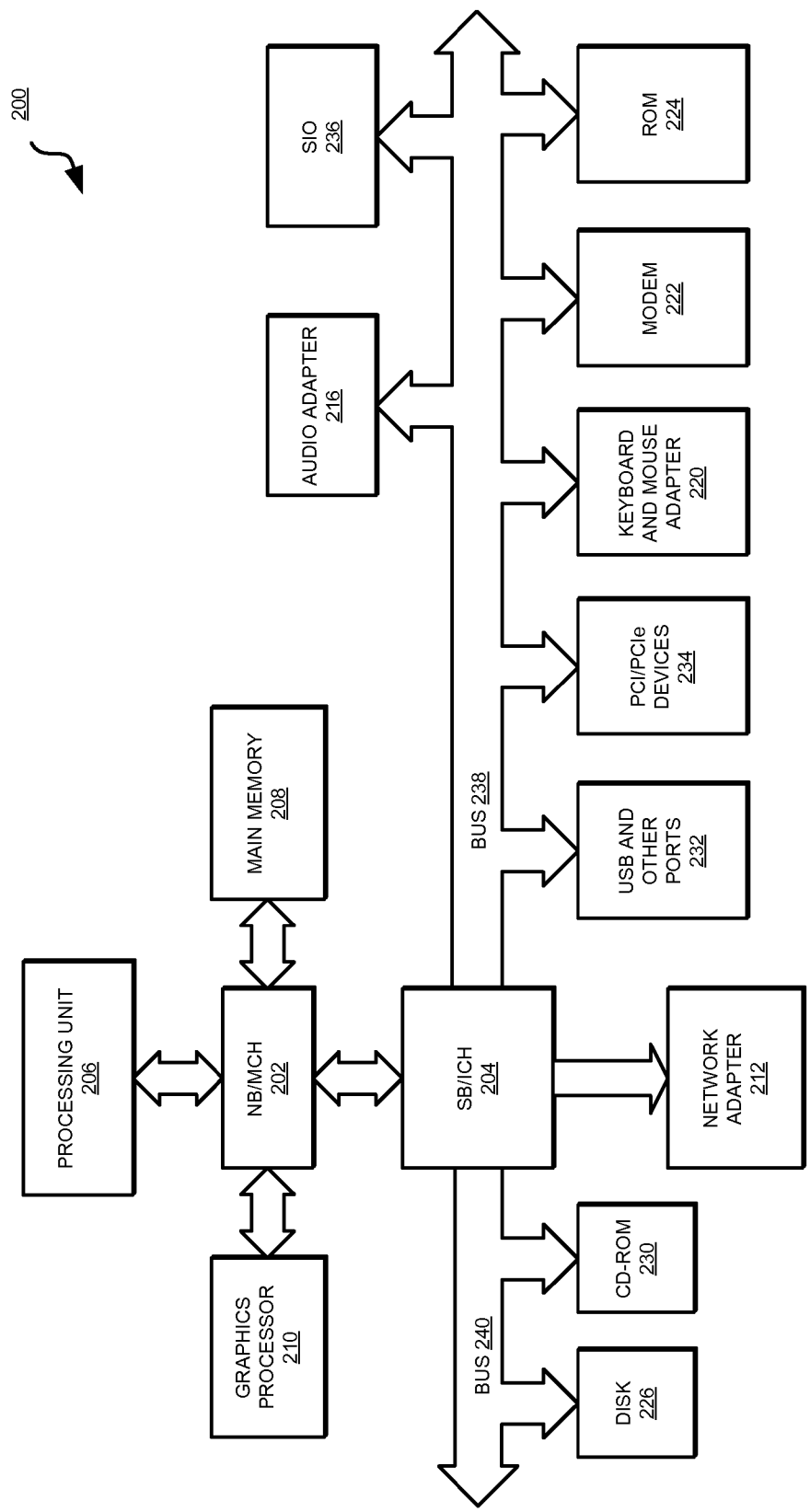
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device that can be configured for communicating over an overlay. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Parser 103 is an existing parser tool. For example, in an existing token extraction process, parser 103 is configured to operate with NLP engine 107 to extract a set of tokens from corpus 111. Application 105 operates in conjunction with parser 103 and NLP engine 107 to produce a set of compound tokens, weighted compound tokens, confidence rated compound tokens, or some combination thereof. Application 105 uses one or more dictionaries and language models 109 to produce such compound tokens.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
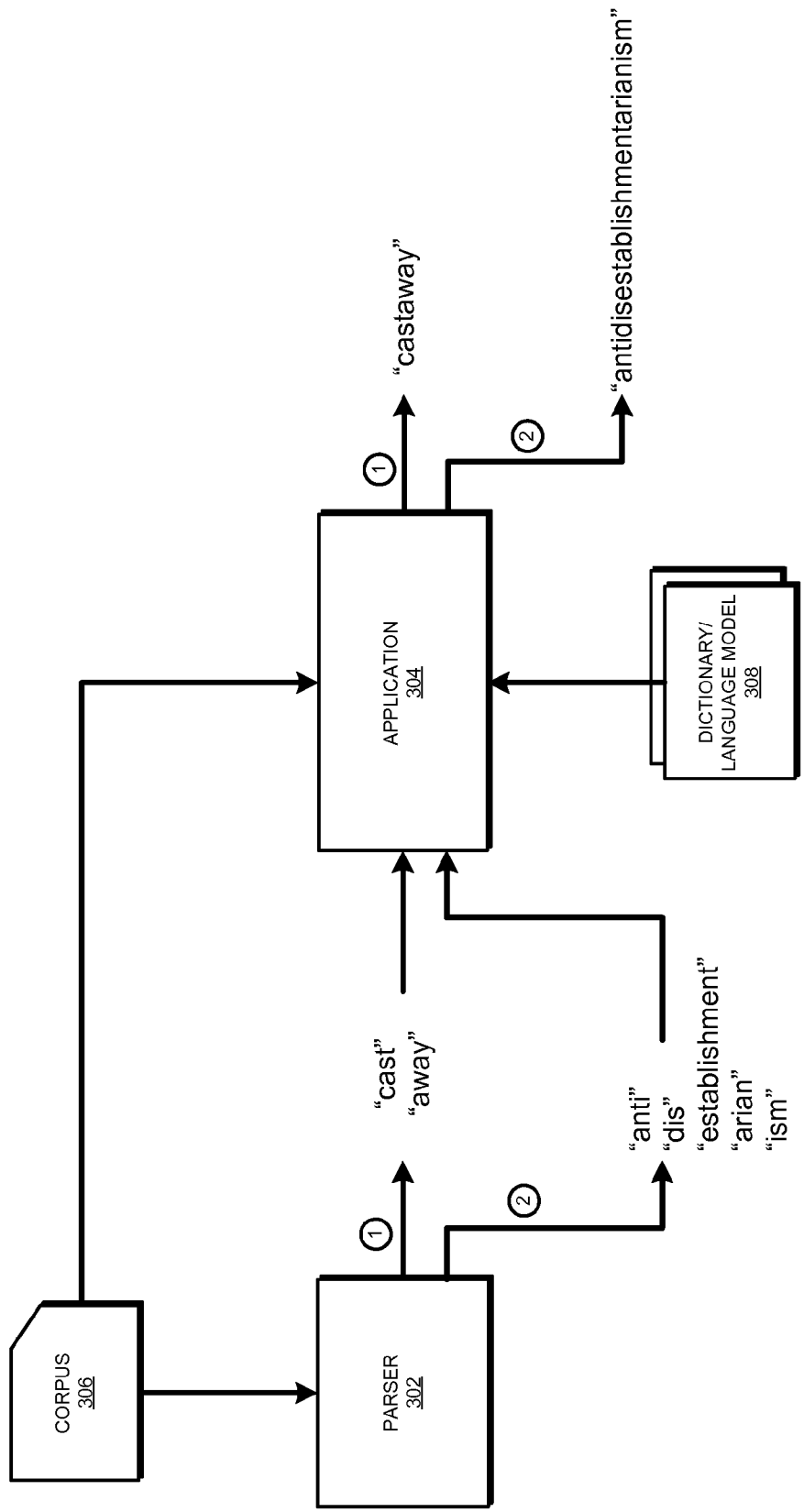
FIG. 3 depicts a block diagram of an example configuration for recombining incorrectly separated tokens in Natural Language Processing in accordance with an illustrative embodiment

With reference to FIG. 3, this figure depicts a block diagram of an example configuration for recombining incorrectly separated tokens in Natural Language Processing in accordance with an illustrative embodiment. Parser 302 is an example of parser 103, application 304 is an example of application 105, and corpus 306 is an example of corpus 111 in FIG. 1. Dictionary/language model 308 comprises one or more of dictionaries and/or language models 109 in FIG. 1. Dictionary/language model 308 may include one or more dictionaries, such as a language dictionary, a subject-matter-specific dictionary, or both. Dictionary/language model 308 may also include one or more language models, such as a language-specific language model, a subject-matter-specific language model, or both.

Assume that corpus 306 comprises example text in English language. In example path labeled "1", parser 302 produces tokens "cast" and "away" by parsing a portion of corpus 306. Application 304, using corpus 306 and dictionary/model 308 produces the compound token "castaway". In example path labeled "2", parser 302 produces tokens "anti" "dis" "establishment" "arian" and "ism" by parsing a portion of corpus 306. Application 304, using corpus 306 and dictionary/model 308 produces the compound token "antidisestablishmentarianism".

For example, application 304 uses dictionary/model 308 to select tokens for compounding as described herein. Application 304 uses corpus 306 for weighting and confidence rating the compound tokens as described herein.

Figure 4:
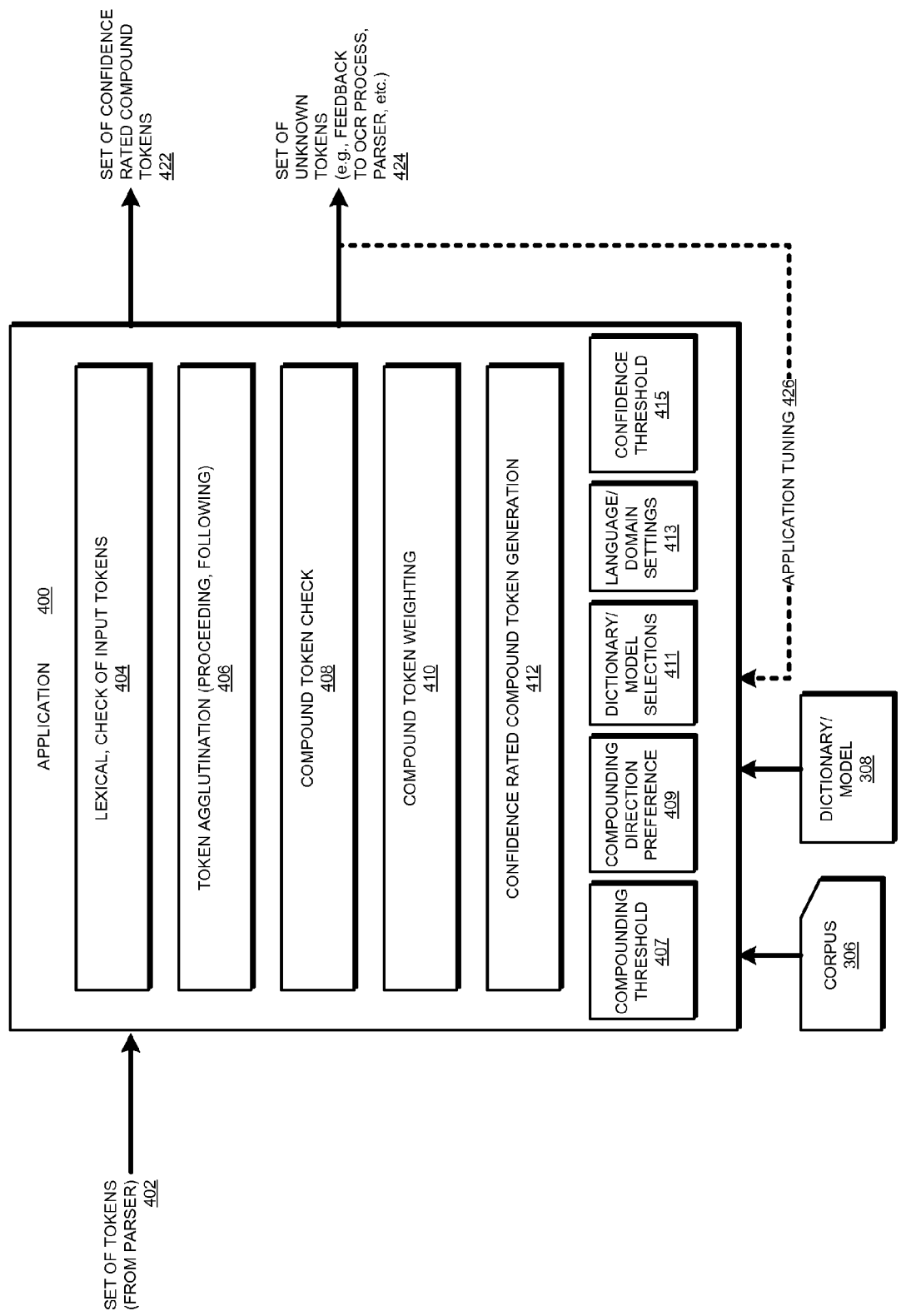
FIG. 4 depicts a block diagram of example functional components for recombining incorrectly separated tokens in Natural Language Processing in accordance with an illustrative embodiment

With reference to FIG. 4, this figure depicts a block diagram of example functional components for recombining incorrectly separated tokens in Natural Language Processing in accordance with an illustrative embodiment. Application 400 is an example of application 304 in FIG. 3.

Application 400 receives set 402 of tokens from a parser, such as from parser 302 in FIG. 3. Set 402 is an ordered set of tokens as described elsewhere in this disclosure. Component 404 performs a lexical check of an input token from set 402. For example, component 404 uses one or more dictionary/model 308 in FIG. 3 to determine whether the input token exists in the dictionary or model.

When component 404 identifies a token that does not pass the lexical check, component 406 agglutinates that token with one or more preceding tokens, one or more following tokens, or some combination thereof, from ordered set 402. When optional compounding threshold 407 is configured in application 400, component 406 limits the agglutination process to threshold 407 number of tokens from set 402. When optional compounding direction preference 409 is configured in application 400, component 406 attempts to agglutinate tokens in direction 409 before attempting to agglutinate tokens a direction opposite of direction 409.

Component 408 checks whether a compound token produced from component 406 exists in dictionary/model 308, corpus 306, or a combination thereof. If the compound token is found in dictionary/model 308, corpus 306, or a combination thereof, the compound token passes the check of component 408.

Note that more than one language-specific dictionaries, subject-matter-specific dictionaries, language-specific language models, subject-matter-specific language models, or a combination thereof, may be available to application 400 in the form of dictionary/model 308 in a given implementation. Optional parameter 411 can be configured to select certain dictionaries and/or models from dictionary/model 308 for use with the operations of components 404 and 408. Optional parameter 413 can be configured to specify or control other language or domain-specific aspects of the operations of the various components in application 400 in the manner described elsewhere in this disclosure.

When a compound token passes the check of component 408, component 410 assigns one or more weights to the compound token using a length of the compound token, a frequency of occurrence of the compound token in corpus 306, a contextual relevance of the compound token in corpus 306, or some combination thereof. Component 412 computes a confidence rating of a weighted compound token produced from component 410. When optional confidence threshold 415 is configured in application 400, component 412 can also select compound tokens with confidence ratings at least meeting confidence threshold 415.

Application produces set 422 of confidence rated compound tokens. For those tokens that do not pass the lexical check of component 404, but from which component 406 cannot produce any compound tokens that pass the checks of component 408, application 400 outputs such tokens in set 424 of unknown or unrecognized tokens.

Because set 424 contains tokens that were obviously extracted but could not be used for lexical or compounding failures, an upstream process that contributed to the generation of such tokens can be adjusted to analyze the data of the corpus differently, and perhaps identify and extract different tokens in the next iteration. Therefore, set 424 of unknown tokens can be used as feedback to, for example, an upstream OCR process, or the parser that produced set 402, for improving the accuracy of the token extraction process, the quality of the extracted tokens, or both.

Furthermore, set 424 or a subset thereof can also be used as feedback to application 400. For example, the knowledge that tokens in set 424 failed a check performed by component 408, one or more of optional parameters 407, 409, 411, 413, or 415 can be adjusted such that previously untried agglutinations may emerge from the tokens of set 424 in a next iteration. One objective of such use of set 424 of unknown tokens is to minimize set 424.

Figure 5:
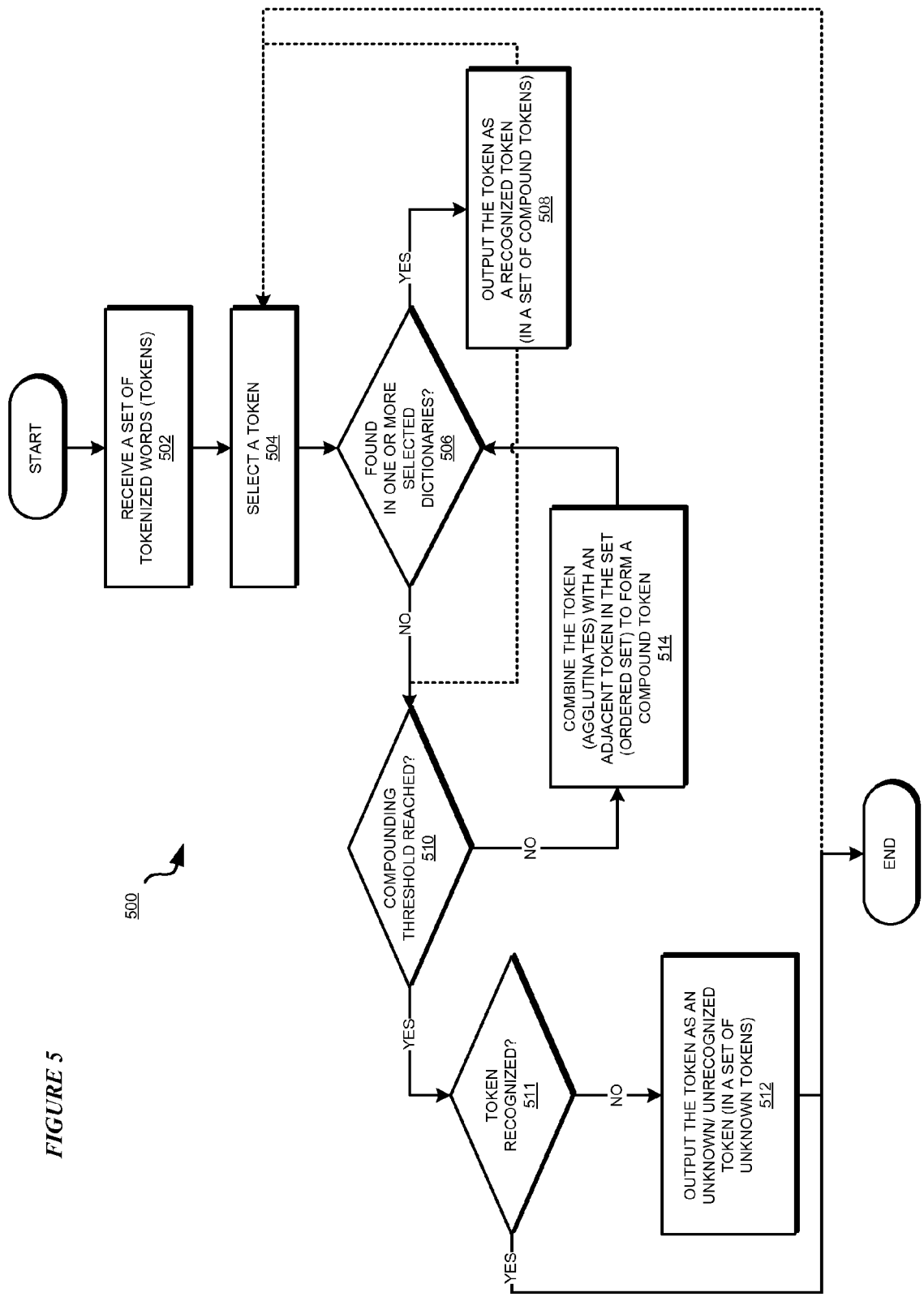
FIG. 5 depicts a flowchart of an example process for recombining incorrectly separated tokens in Natural Language Processing in accordance with an illustrative embodiment

With reference to FIG. 5, this figure depicts a flowchart of an example process for recombining incorrectly separated tokens in Natural Language Processing in accordance with an illustrative embodiment. Process 500 can be implemented using application 400 in FIG. 4.

The application receives a set of tokenized words, to wit, tokens (block 502). The application selects a token from the received set (block 504).

The application determines whether the selected token is found in one or more of the selected dictionaries or models (block 506). If the selected token is found in one or more of the selected dictionaries or models ("Yes" path of block 506), the application identifies the selected token as a recognized token (block 508).

In one embodiment, the application returns to block 504 to select another token and leaves the recognized token as it is for downstream use. In another embodiment, the application tries to form a longer compound token using the recognized token as well. To attempt to form a compound token with the recognized token the application proceeds to block 510.

If the selected token is not found in one or more of the selected dictionaries or models ("No" path of block 506), the application determines whether a compounding threshold has been reached (block 510). If the compounding threshold has been reached ("Yes" path of block 510), the application determines whether the token has been recognized (block 511). In other words, block 511 determines whether block 511 is reached from the "Yes" path or the "no" path of block 506.

If the compounding threshold has not been reached ("No" path of block 510), the application agglutinates the selected token with an adjacent token in the ordered set of tokens to form a compound token, or a longer compound token, as the case may be (block 514). The application returns to block 506 to test the newly constructed compound token. If the compound token exists in one or more of the selected dictionaries or models ("Yes" path of block 506), the application outputs the compound token in a set of compound tokens at block 508. The application proceeds thereafter as described earlier.

If the token was recognized and the application was only attempting to build a longer compound token if possible ("Yes" path of block 511), the application either ends process 500 thereafter, or returns to block 504 to select another token if any remain in the ordered set received from the parser. If the token was not found in one or more of the selected dictionaries or models and the application was attempting to build a valid compound token ("No" path of block 511), the application outputs the selected token as an unknown or unrecognized token (block 512). The application either ends process 500 thereafter, or returns to block 504 to select another token if any remain in the ordered set received from the parser.

Figure 6:
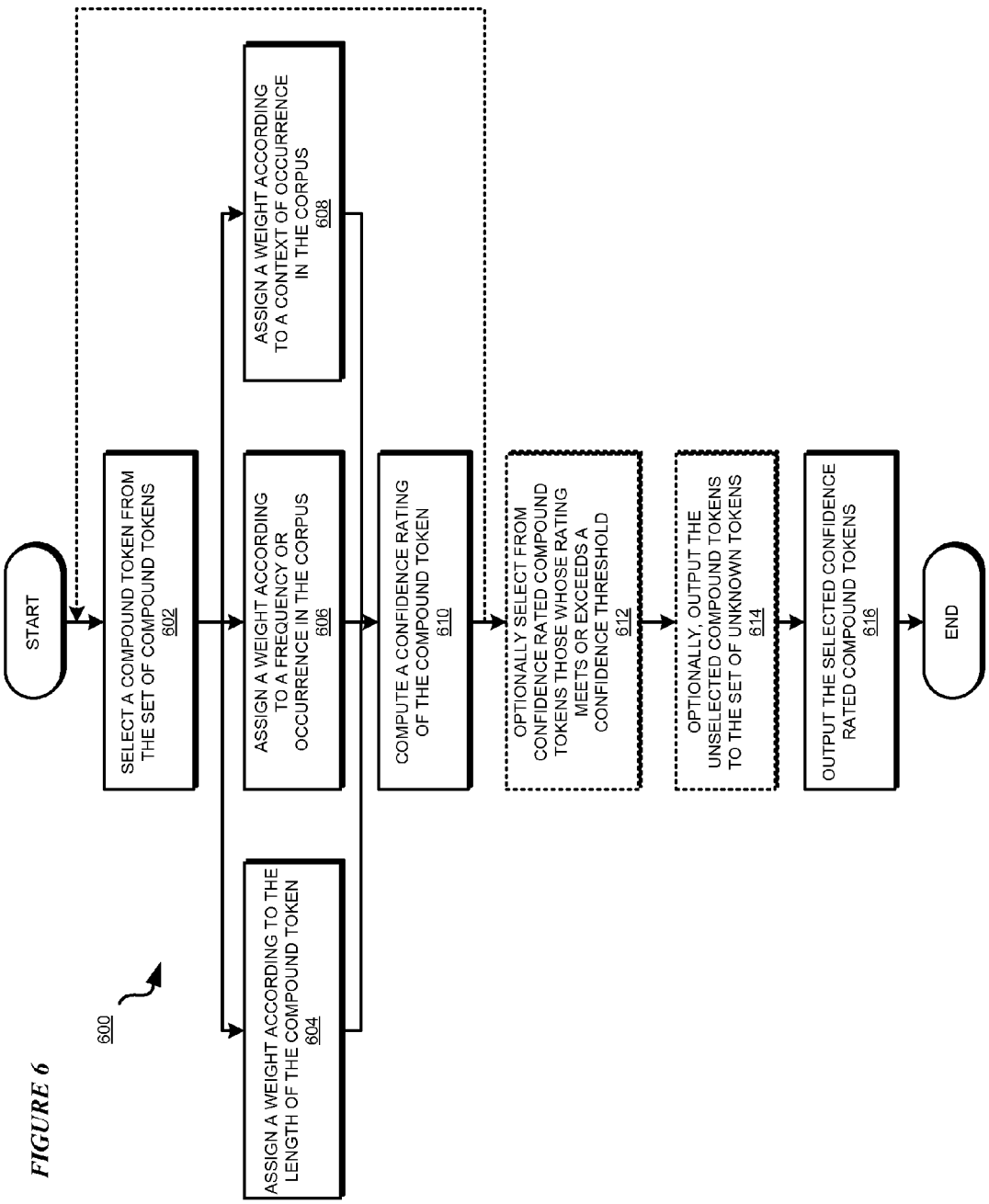
FIG. 6 depicts a flowchart of an example process for weighting and confidence rating compound tokens in accordance with an illustrative embodiment; an FIG. 7 depicts a flowchart of an example process for using unrecognized tokens to improve an NLP process in accordance with an illustrative embodiment.

With reference to FIG. 6, this figure depicts a flowchart of an example process for weighting and confidence rating compound tokens in accordance with an illustrative embodiment. Process 600 can be implemented in application 400 in FIG. 4.

The application selects a compound token from a set of compound tokens output from process 500 of FIG. 5. The application applies some combination of one or more methods of blocks 604, 606, and 608 to the selected compound token.

For example, the application assigns a weight to the compound token according to the length of the compound token (block 604). The application assigns a weight to the compound token according to the frequency of occurrence of the compound token in the corpus from which set of tokens received in block 502 of FIG. 5 was extracted (block 606). The application assigns a weight to the compound token according to the context of an occurrence of the compound token in the corpus from which set of tokens received in block 502 of FIG. 5 was extracted (block 608).

Using the one or more weights assigned to the selected compound token via one or more of blocks 604, 606, and 608, the application computes a confidence rating of the compound token (block 610). The application returns to block 602 to select another compound token if any remain in the set of block 602 to be weighted and confidence rated in this manner.

Optionally, the application selects from the confidence rated compound tokens those compound tokens whose confidence rating meets or exceeds a confidence threshold (block 612). Optionally, the application outputs the confidence rated compound tokens that were not selected at block 612 into a set of unknown tokens or a set of low confidence compound tokens (block 614).

The application outputs the selected confidence rated compound tokens for use in the NLP process (block 616). The application ends process 600 thereafter.

Figure 7:
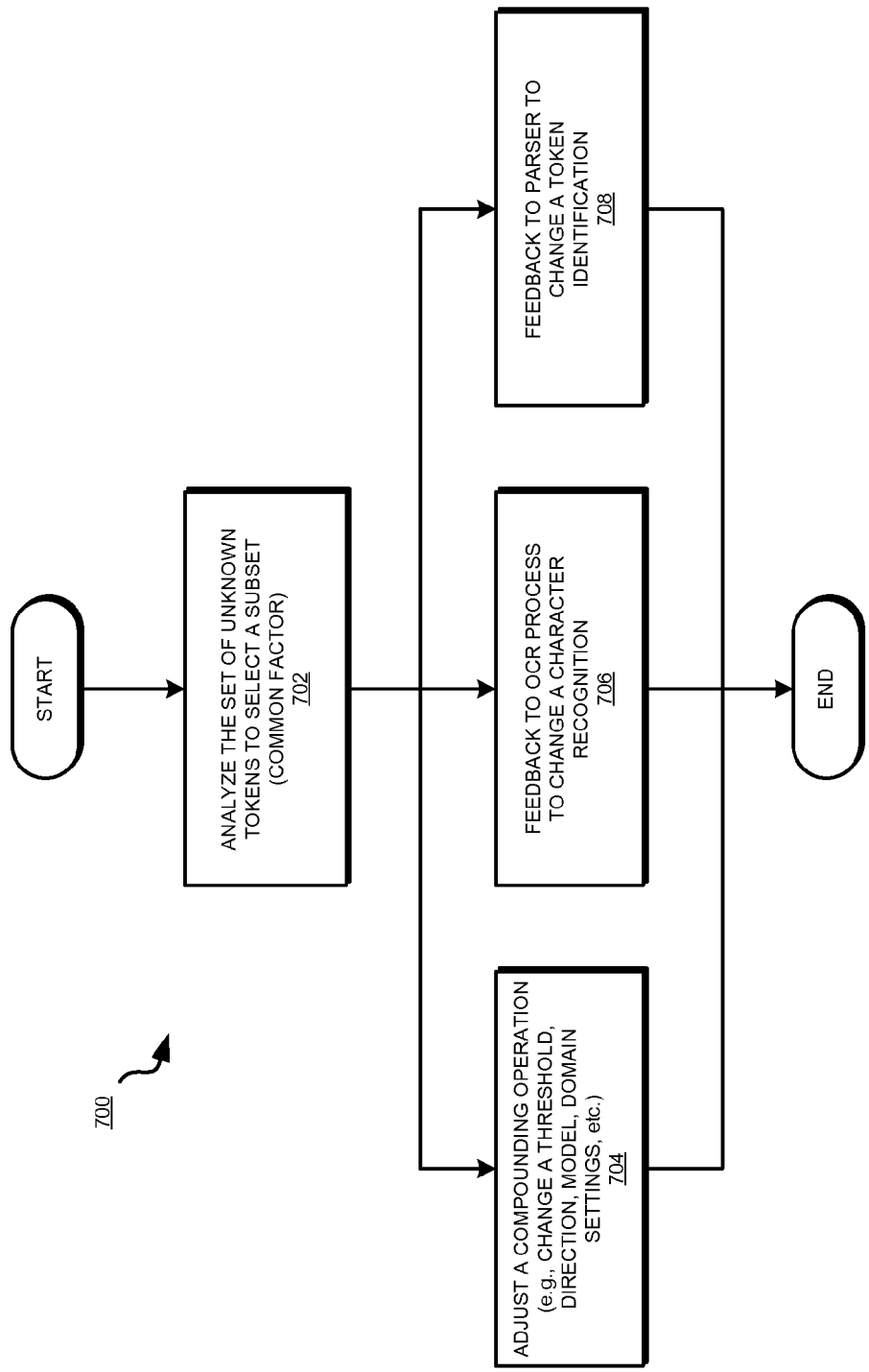

With reference to FIG. 7, this figure depicts a flowchart of an example process for using unrecognized tokens to improve an NLP process in accordance with an illustrative embodiment. Process 500 can be implemented using application 400 in FIG. 4.

The application analyzes a set of unknown tokens, such as set 424 in FIG. 4, to select a subset (block 702). The subset of unrecognized tokens share some common factors, such as a character or a character string that is common to the unrecognized tokens in the selected subset.

The application performs one or more of the operations of blocks 704, 706, and 708 with the subset. For example, the application adjusts a compounding operation, such as the operation of block 406 in FIG. 4 (block 704). As another example, the application feeds back the subset to an OCR process to change how a character is recognized from the corpus (block 706). As another example, the application feeds back the subset to a parser to change how a token is identified from the corpus (block 708). The application ends process 700 thereafter.

Thus, a computer implemented method, system or apparatus, and computer program product are provided in the illustrative embodiments for recombining incorrectly separated tokens in Natural Language Processing. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   determining that tokens have been incorrectly separated due to an incorrect Natural Language Processing (NLP) operation on a corpus; and
   recombining, as a part of correcting the incorrect NLP operation, the incorrectly separated tokens, the recombining comprising:
   determining whether a token from an ordered set of tokens is present in a dictionary, the dictionary being related to the corpus from which the ordered set of tokens is extracted;
   determining whether a compounding threshold has been reached, wherein the compounding threshold limits a number of tokens that can be agglutinated to form a compound token;
   agglutinating using a processor and a memory, responsive to the token not being present in the dictionary, and responsive to the compounding threshold not having been reached, the token with a next adjacent token in the ordered set of tokens to form the compound token;
   determining whether the compound token is present in the dictionary;
   assigning a weight to the compound token responsive to the compound token being present in the dictionary;
   computing a confidence rating of the compound token, the confidence rating being a function of the weight; and
   using the compound token and the confidence rating in performing an NLP operation on the corpus.

2. The method of claim 1, further comprising:
   determining a length of the compound token, wherein the weight is a function of the length.

3. The method of claim 1, further comprising:
   determining a frequency of occurrence of the compound token in a portion of the corpus, wherein the weight is a function of the frequency.

4. The method of claim 1, further comprising:
   determining a contextual relevance of an occurrence of the compound token in a portion of the corpus, wherein the weight is a function of the contextual relevance.

5. The method of claim 4, wherein the contextual relevance comprises a grammatical correctness of the compound token in the portion of the corpus.

6. The method of claim 1, further comprising:
   producing a set of compound tokens, the compound token being a member of the set of compound tokens;
   reducing the set of compound tokens by eliminating a subset of compound tokens from the set of compound tokens, the subset of compound tokens comprising those confidence rated compound tokens which have a contextual relevance below a level of contextual relevance in a portion of the corpus; and
   weighting a remaining subset of compound tokens using one of (i) a length of the compound token and (ii) a frequency of occurrence of the compound token in the portion of the corpus.

7. The method of claim 1, wherein the next adjacent token is a preceding token that immediately precedes in the ordered set of tokens one of (i) the token, and (ii) another token agglutinated with the token.

8. The method of claim 1, wherein the next adjacent token is a following token that immediately follows in the ordered set of tokens one of (i) the token, and (ii) another token agglutinated with the token.

9. The method of claim 1, further comprising:
   ordering tokens in the ordered set of tokens such that a first token precedes the token in the ordered set of tokens responsive to a first word corresponding to the first token preceding a second word corresponding to the token in a corpus, and a third token follows the token in the ordered set of tokens responsive to a third word corresponding to the third token following a second word corresponding to the token in the corpus.

10. The method of claim 9, wherein the first word and the second word are separated in the corpus by one of (i) a blank space, (ii) a hyphen, and (iii) another word, wherein the first word and the second word are to be agglutinated in the corpus, and wherein the first word is separated from the second word in the corpus as a result of a formatting of text in the corpus.

11. The method of claim 9, further comprising:
identifying the first word as the first token; and identifying the second word as the token.

12. The method of claim 1, further comprising:
selecting the dictionary, wherein the dictionary is related to the corpus because the dictionary is specific to a language of the corpus.

13. The method of claim 1, further comprising:
selecting the dictionary, wherein the dictionary is related to the corpus because the dictionary is specific to a subject-matter of the corpus.

14. The method of claim 1, wherein the method is embodied in a computer program product comprising one or more computer-readable storage devices and computer-readable program instructions which are stored on the one or more computer-readable tangible storage devices and executed by one or more processors.

15. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

16. A computer program product comprising one or more computer-readable storage media, and program instructions stored on at least one of the one or more storage media, the stored program instructions comprising:
program instructions to determine that tokens have been incorrectly separated due to an incorrect Natural Language Processing (NLP) operation on a corpus; and
program instructions to recombine, as a part of correcting the incorrect NLP operation, the incorrectly separated tokens, the recombining comprising:
program instructions to determine whether a token from an ordered set of tokens is present in a dictionary, the dictionary being related to the corpus from which the ordered set of tokens is extracted;
program instructions to determine whether a compounding threshold has been reached, wherein the compounding threshold limits a number of tokens that can be agglutinated to form a compound token;
program instructions to agglutinate using a processor and a memory, responsive to the token not being present in the dictionary, and responsive to the compounding threshold not having been reached, the token with a next adjacent token in the ordered set of tokens to form the compound token;
program instructions to determine whether the compound token is present in the dictionary;
program instructions to assign a weight to the compound token responsive to the compound token being present in the dictionary;
program instructions to compute a confidence rating of the compound token, the confidence rating being a function of the weight; and
program instructions to use the compound token and the confidence rating in performing an NLP operation on the corpus.

17. The computer program product of claim 16, further comprising:
program instructions to determine a length of the compound token, wherein the weight is a function of the length.

18. The computer program product of claim 16, further comprising:
program instructions to determine a frequency of occurrence of the compound token in a portion of the corpus, wherein the weight is a function of the frequency.

19. The computer program product of claim 16, further comprising:
program instructions to determine a contextual relevance of an occurrence of the compound token in a portion of the corpus, wherein the weight is a function of the contextual relevance.

20. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:
program instructions to determine that tokens have been incorrectly separated due to an incorrect Natural Language Processing (NLP) operation on a corpus; and
program instructions to recombine, as a part of correcting the incorrect NLP operation, the incorrectly separated tokens, the recombining comprising:
program instructions to determine whether a token from an ordered set of tokens is present in a dictionary, the dictionary being related to the corpus from which the ordered set of tokens is extracted;
program instructions to determine whether a compounding threshold has been reached, wherein the compounding threshold limits a number of tokens that can be agglutinated to form a compound token;
program instructions to agglutinate using a processor and a memory, responsive to the token not being present in the dictionary, and responsive to the compounding threshold not having been reached, the token with a next adjacent token in the ordered set of tokens to form the compound token;
program instructions to determine whether the compound token is present in the dictionary;
program instructions to assign a weight to the compound token responsive to the compound token being present in the dictionary;
program instructions to compute a confidence rating of the compound token, the confidence rating being a function of the weight; and
program instructions to use the compound token and the confidence rating in performing an NLP operation on the corpus.

* * * * *